Sept. 22, 1925.
I. R. RENNER
1,554,370
PNEUMATIC TIRE AND METHOD OF MAKING THE SAME
Filed April 14, 1924
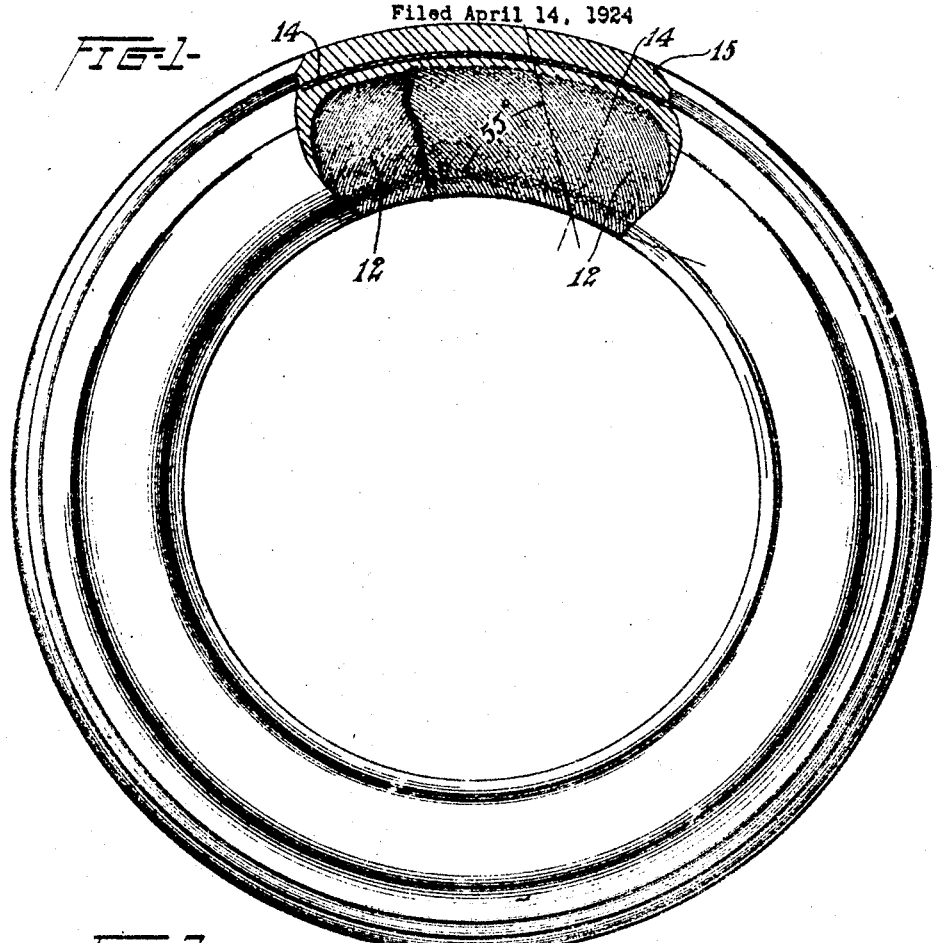
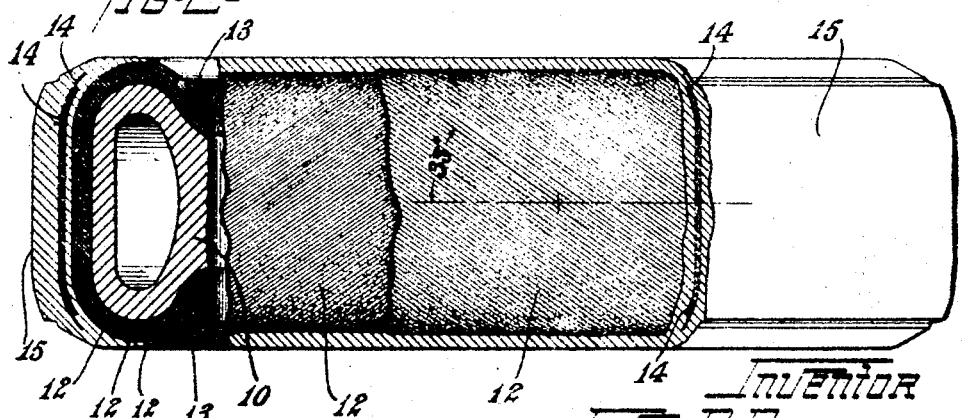
Inventor
Truth R. Renner.
By Robert McPierson
Atty Patented Sept. 22, 1925.

1,554,370

UNITED STATES PATENT OFFICE.

IRVIN R. RENNER, OF AKRON, OHIO, ASSIGNOR TO THE B. F. GOODRICH COMPANY, OF NEW YORK, N. Y., A CORPORATION OF NEW YORK.

PNEUMATIC TIRE AND METHOD OF MAKING THE SAME.

Application filed April 14, 1924. Serial No. 706,538.

*To all whom it may concern:*

Be it known that I, IRVIN R. RENNER, a citizen of the United States, residing at Akron, in the county of Summit and State of Ohio, have invented a certain new and useful Pneumatic Tire and Method of Making the Same, of which the following is a specification.

This invention relates to pneumatic tires having a carcass of thread or cord and rubber construction vulcanized in oblate, oval, cross-sectional form instead of the usual substantially-circular section, the tire having bulged side-walls, giving the working portion a greater width than the width of the base within the rim.

The main object of the invention is to provide a pneumatic tire or tire-casing of the type referred to, having no undue thickening of the walls in any working part, which will have high load-sustaining power and great endurance at moderate inflation pressure, together with increased lateral stability as compared with ordinary pneumatic tires of the same base width, and a less abrupt flexure of the side walls under a given load and inflation.

According to this invention, the tire carcass is made to retain a pronounced oval or elliptical shape when inflated to service pressure. Whereas, formerly it has been sought to obtain this result with inextensible bands or other special construction in the tread wall, in the present invention the oval inflated shape is realized principally or entirely by the use of bias threads laid at suitable angles to the circumferential tread and side lines of the tire. The radial depth of the carcass when inflated is at least as great as when the tire is vulcanized, and the rubber and fabric therein are accordingly not so overstrained as to cause ply separation and other ill effects by the bending of the tire wall under load.

Of the accompanying drawings:

Fig. 1 is a side elevation of a tire embodying my invention in a preferred form, parts being sectioned and broken away.

Fig. 2 is a plan view of the same, with the tire-core therein, parts being sectioned and broken away.

Referring to the drawings, 10 (Fig. 2) is an annular, laterally bulged, tire core of which the outer peripheral surface or tread portion is substantially flat transversely, and 12, 12 are superposed plies of weftless cord fabric constituting a tire carcass upon said core. The usual weak-wefted fabric could of course be used instead of weftless fabric. The threads in succeeding plies are oppositely biased, as is customary. The particular tire here shown, being of the straight bead type, comprises inextensible bead-cores 13, 13, but my invention is not limited to straight bead tires. Wide breaker strips 14, 14, to correspond to the wide form of the tire, are interposed between the wide tread, 15, and carcass of the tire. All parts of the tire are prepared and applied to the core in accordance with practice now standard in the building of tires of circular section, except that instead of cutting the fabric on the usual bias of about 45° I so cut it that the cords thereof are disposed at a substantially smaller angle to the longitudinal axis and side edges of the tire strip. I have found that I can safely reduce the angle of the cords in the tread portion of the finished tire to considerably less than 40° to the longitudinal axis of the strip, and thereby maintain a pronounced elliptical cross-sectional form in the inflated tire, the longitudinal stretchability of the tread wall being so small as to prevent it from being moved out radially to any great extent by the air pressure.

I preferably cut the fabric on an angle of about 35° to the cords, form an endless band from pieces so cut, and stretch it onto the core, the band being of such size as to call for a substantial stretch thereof in mounting it upon the tread portion of the core. The stretching of the band reduces the angle of the cords with relation to its median line, the band of course becoming narrower as it elongates, while the stitching down of the side margins of the band results in the cords therein assuming a greater angle to the bead, as will be more fully described hereinafter. Thus I obtain in the finished tire an angle preferably of about 33° to the median line in the tread portion, as shown in Fig. 2, and with the cords disposed at this angle in the tread portion I have obtained tires of pronounced elliptical cross-sectional form under inflation without the development of excessive local stresses therein, the ratio of major to minor axes of the ellipse in the carcass of the tire here shown being approximately 2 to 1.

The tire fabric, being rolled down to the bead in the usual manner, is somewhat elongated in a direction radial of the tire, from the "neutral" line, or line corresponding to the circumference of the band before it is stretched onto the core, to the bead, and correspondingly shortened longitudinally of the tire, with a progressive increase of these effects from such neutral line to the bead, and this gives the cords at the bead a greater angle to a tangent of the bead line than they had to the edge of the flat strip, and of course a greater angle than they have to the median line of the tread, the longitudinal stretching of the band onto the core having in the tread region decreased the angle of the cords to the median line. Thus the angle at the bead may be as large as 55°, as shown in Fig. 1, when the angle at the tread is 33°, as shown in Fig. 2.

Assuming the core 10 to be of rigid, sectional construction, the tire and core may be placed in an outer mold of suitable form or may be cross-wrapped with cloth, and then vulcanized, but in accordance with the more usual practice in the manufacture of cord tires, I prefer to remove the forming core from the raw tire, insert a water bag or air bag of similar form, place the tire and bag in a mold having a cavity somewhat larger than the body of the tire and expand said tire against the mold by means of internal fluid pressure during vulcanization. The final shape of the tire is determined by that of the mold cavity, which approximates the shape in which the tire is laid up on the form or core 10.

The tread wall of the tire when inflated on the wheel takes a slightly arcuate form. I may form the tread-wall with a slight curvature on the core, instead of flat, and prefer to do so in tires for lighter vehicles, as will be understood without special illustration.

Instead of using a forming core, I may lay up the tire in flat band form, expand the raw band to tire shape by fluid pressure while drawing the beads together in accordance with a known practice and then vulcanize it in the elliptical form described. Other modifications could be made without departing from my invention.

By cutting the fabric at an angle of substantially less than 45° to its edges, forming the tire as described and vulcanizing it in oblate, oval form, I secure the advantages mentioned in the introduction. An elliptical tire of ample strength and durability may be obtained, having comparatively thin and flexible walls, by the use of the same materials as in an ordinary tire, formed by operations which are now standard, and with but little modification of the usual equipment.

Increased lateral stability results from the smaller angle of the threads, especially when the tire not only is vulcanized in an oblate, oval form, but is made to retain essentially that form when inflated. The side walls in a tire of this type flex less sharply under load than in a tire of the ordinary type, the flexure being distributed over a longer arc on the periphery of the wheel.

The angle at which the threads lie with respect to the edges of the flat fabric strips before incorporation in the tire, as well as the angle which they assume in the finished tire may vary more or less from the example given, depending on the chosen ratio of the major and minor axes of the oval in the finished tire and also on the method employed in forming the tire, whether shaped around a core, with varying positions of the neutral line of the original flat band with relation to the core, or shaped by expanding the middle of a flat band from substantially the bead diameter as in the modification above described, the latter being generally known as the "flat band" method to distinguish it from the "core" method. Starting with the same angle of cut, the "flat band" method results in a smaller angularly of the threads in the finished tire than the "core" method, and such angularity is less in all working parts of the tire than the angularity of the threads in the original band.

The "core" method, as herein illustrated, is preferred for large tires having a ratio of major to minor axes of the inflated, oval carcass of 4 to 3 or greater, adapted for use on wide rims, as the stitching down of the carcass-forming bands, cut as described, gives an angularity of the threads at the beads greater than the angle of cut, and this in conjunction with the small angle at the tread, preserves the desired ratio of the axes without setting up undue strains in the carcass during operation.

It is known that a small angle for the threads, especially as normally found in a tire made by the "flat band" method when the bands are cut at an angle of 45° or less, tends to produce an oblate, oval form in an inflated tire which has its carcass vulcanized in substantially circular form, but this effect has heretofore been a disadvantage, tending to cause undue strains and ply separation in the carcass. In the present invention, by vulcanizing in oblate, oval form, a tire having its threads disposed at an angle tending to retain the oval form, I avoid or minimize these strains and produce a tire which can safely be run at a lower inflation pressure for a given load.

I claim:

1. A pneumatic tire having a laminated carcass of oppositely-biased threads and rubber vulcanized in oblate, oval, cross-sectional form, the threads having an angularity, which in the tread portion is less than 40° to the middle circumferential line, tending to maintain said carcass in the oval form when inflated.

2. A pneumatic tire according to claim 1, whose radial depth when inflated is at least as great as when not inflated.

3. A beaded pneumatic tire casing with bulging sides, having a laminated carcass vulcanized in oblate, oval, cross-sectional form and made of crossed rubberized threads extending obliquely throughout their length from bead to bead, the threads in the tread portion having an angle to the middle circumferential line of less than 40° and the threads at the beads having an angle greater than the angle in the thread portion.

4. A pneumatic tire casing according to claim 3, having a carcass made from plies of rubberized threads which, when the plies are flat, lie at an angle to their edges not greater, substantially, than 40°, said carcass being of oblate, oval section both when deflated and when inflated.

5. A beaded pneumatic tire having a carcass vulcanized in a pronounced oblate, oval cross-sectional form and maintained substantially in said form, when inflated, essentially by reason of the angularity of its diagonal threads, said carcass comprising oppositely-biased plies of rubberized threads extending diagonally throughout their length from bead to bead, the threads having, in the tread, an angularity of less than 35° to the middle circumferential line and having, at the beads, a greater angularity to the edges of the casing.

6. A beaded pneumatic tire casing having a laminated carcass of oppositely-biased threads and rubber vulcanized in oblate, oval, cross-sectional form and adapted to maintain the oval form when inflated essentially by reason of the angularity of its diagonal threads, the inflated carcass having a ratio of major to minor axes as great as, approximately, 4 to 3, the threads having an angle in the tread of not more than 35° to the middle circumferential line and an angle at the beads greater than 45°.

7. The method of making pneumatic tires which comprises building the carcass with rubberized, oppositely-biased thread plies having an oblate, oval-forming angularity of threads to the circumferential lines of the tire, which is less in the tread than in the side-walls, and not substantially greater than 40° in the tread and vulcanizing the carcass in oblate, oval, cross-sectional form.

8. The method of making pneumatic tire casings which comprises building the carcass on a core of oblate, oval, cross-sectional form, with oppositely-biased strips of rubberized threads in which the threads, when the strips are flat, lie at an angle to the edges of between 30° and 40°, stretching the plies at the tread and condensing them at the sides, forming bead edges on the carcass, and vulcanizing the casing in oblate, oval form with bulging sides substantially farther apart than said bead edges.

9. Steps in the method of making the tire casing defined in claim 6 which comprise forming the carcass from bands cut at an angle of less than 40° to the threads, stretching said bands at the tread onto a core of oblate oval section, and stitching them down to the beads at the sides of the core.

In witness whereof I have hereunto set my hand this 2nd day of April, 1924.

IRVIN R. RENNER.